United States Patent
Fujii et al.

(10) Patent No.: US 8,151,089 B2
(45) Date of Patent: Apr. 3, 2012

(54) ARRAY-TYPE PROCESSOR HAVING PLURAL PROCESSOR ELEMENTS CONTROLLED BY A STATE CONTROL UNIT

(75) Inventors: Taro Fujii, Kanagawa (JP); Koichiro Furuta, Kanagawa (JP); Masato Motomura, Kanagawa (JP); Kenichiro Anjo, Kanagawa (JP); Yoshikazu Yabe, Kanagawa (JP); Toru Awashima, Kanagawa (JP); Takao Toi, Kanagawa (JP); Noritsugu Nakamura, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1454 days.

(21) Appl. No.: 10/694,822

(22) Filed: Oct. 29, 2003

(65) Prior Publication Data

US 2004/0107332 A1 Jun. 3, 2004

(30) Foreign Application Priority Data

Oct. 30, 2002 (JP) .................................. 2002-315735

(51) Int. Cl.
  *G06F 15/00* (2006.01)
  *G06F 15/76* (2006.01)
(52) U.S. Cl. ......................................................... 712/16
(58) Field of Classification Search ................ 712/10–22
See application file for complete search history.

(56) References Cited

U.S. PATENT DOCUMENTS

| | | | | |
|---|---|---|---|---|
| 3,537,074 A * | 10/1970 | Sankin et al. | .................... | 712/14 |
| 4,850,027 A | 7/1989 | Kimmel | | |
| 5,581,767 A * | 12/1996 | Katsuki et al. | .................. | 712/11 |
| 6,145,072 A * | 11/2000 | Shams et al. | ..................... | 712/22 |
| 6,414,368 B1 * | 7/2002 | May et al. | ...................... | 257/523 |
| 6,606,699 B2 * | 8/2003 | Pechanek et al. | ............... | 712/16 |
| 2001/0017833 A1 | 8/2001 | Yamada et al. | | |

FOREIGN PATENT DOCUMENTS

| | | |
|---|---|---|
| EP | 0 605 401 | 7/1994 |
| JP | 2518902 | 5/1996 |
| JP | 2001-312481 | 11/2001 |

OTHER PUBLICATIONS

Chip Layout Optimiation Using Critical Path Weighting.*

* cited by examiner

*Primary Examiner* — Corey S Faherty
(74) *Attorney, Agent, or Firm* — Young & Thompson

(57) ABSTRACT

A multiplicity of processor elements that are arranged in rows and columns individually execute data processing in accordance with instruction codes that are individually set as data and supply event data as output. A state control unit is composed of a plurality of units that successively switch the instruction codes of the multiplicity of processor elements in accordance with a computer program and the event data, these state control units communicating with each other to realize linked operation as necessary. An event distributing means distributes event data to this plurality of state control units that intercommunicate to realize linked operation, whereby the plurality of state control units can realize linked operation to control a large-scale state transition.

17 Claims, 13 Drawing Sheets

ARRAY-TYPE PROCESSOR HAVING PLURAL PROCESSOR ELEMENTS CONTROLLED BY A STATE CONTROL UNIT

FIELD OF THE INVENTION

The present invention relates to an array-type processor in which a multiplicity of processor elements that each individually executes data processing and for which the connection relations between the processor elements is switch-controlled are arranged in rows and columns and in which the operations of this multiplicity of processor elements are controlled by a state control unit.

DESCRIPTION OF THE RELATED ART

Products referred to as CPUs (Central Processing Units) and MPUs (Micro Processor Units) are currently in practical use as processor units that can freely execute various types of data processing.

In data processing systems that employ these processor units, various application programs that are described by a plurality of instruction codes and various types of processing data are stored in memory devices, the processor units read these instruction codes and processing data in order from the memory devices and successively execute a plurality of operations.

A single processor unit can therefore execute various types of data processing, but in this data processing, the plurality of operations must be successively executed in order and the processor unit must read the instruction codes from the memory device for each successive process, and it is therefore difficult to execute complex data processing at high speed.

On the other hand, when the data processing that is to be executed is limited to a single type, constructing logic circuits to execute this data processing by hardware eliminates the need for a processor unit to read a plurality of instruction codes from memory devices in order and then successively execute the plurality of operations in order. Thus, although complex data processing can be executed at high speed, obviously, only a single type of data processing can be executed.

In other words, a data processing system that allows free switching of application programs enables the execution of various type of data processing, but the execution of high-speed data processing is problematic because the configuration of the hardware is fixed. On the other hand, logic circuits that are constituted by hardware enable high-speed execution of data processing but can execute only one type of data processing because they do not permit modification of the application program.

With the aim of solving this problem, the present applicant has invented and submitted an application for an array-type processor as a data processing device in which the hardware configuration changes in accordance with software (please refer to Japanese Patent Laid-Open Publication No. 2001-312481).

In this array-type processor, a multiplicity of small-scale processor elements are arranged in rows and columns together with a multiplicity of switch elements in a datapath unit, one state control unit being provided together with one of these data path units. The multiplicity of processor elements each individually execute data processing in accordance with instruction codes in which data are individually set, and switching of connection relations is controlled by a multiplicity of switch elements that are individually provided together with the processor elements.

The array-type processor can therefore execute various types of data processing in accordance with software because the configuration of the data paths is changed by switching the instruction codes of the multiplicity of processor elements and the multiplicity of switch elements, and can execute data processing at high speed because, as hardware, a multiplicity of small-scale processor elements simultaneously execute simple data processing.

The array-type processor can continuously execute simultaneous processing in accordance with a computer program because the context of the datapath unit, which is made up of the instruction codes of the above-described multiplicity of processor elements and multiplicity of switch elements, is successively switched by a state control unit for each operation cycle in accordance with the computer program.

The above-described computer program is incorporated in the state control units in advance, and event data are applied as input to the state control units from outside the array-type processor or applied as input to the state control units from the datapath unit.

Although the above-described array-type processor can execute high-speed data processing by means of a multiplicity of processor elements, the state transitions of this multiplicity of processor elements is managed by a single state control unit. As a consequence, executing, for example, two loop transitions, one of four states and the other of six states, together as shown in FIG. 1 calls for a minimum of 12 states, 12 being the smallest common multiple of 4 and 6.

When the number of combined state transitions or the number of states of each transition increases in this way, the number of states expands greatly and interferes with the operating efficiency of the array-type processor. In particular, when condition branches exist in the state transitions, the number of states that are to be managed expands greatly and control in the state control unit becomes problematic.

In the interest of providing solutions for the above-described problems, the present applicant has invented a configuration in which the array-type processor includes a plurality of state control units, and has submitted corresponding applications identified as Japanese Patent Application No. 2002-299028 and Japanese Patent Application No. 2002-299029. In these array-type processors, the state control unit is a plurality of units wherein the plurality of state control units can separately control a plurality of small-scale state transitions, or the plurality of state control units can cooperate to control one large-scale state transition.

However, as described above, the state control units control the state transitions of a multiplicity of processor elements in accordance with event data, and an array-type processor that employs a plurality of state control units must therefore establish a configuration for precisely distributing the event data to the plurality of state control units.

SUMMARY OF THE INVENTION

In view of the above-described problems, the present invention was achieved with the object of providing an array-type processor that is capable of accurately distributing event data to a plurality of state control units.

The array-type processor of the present invention includes a multiplicity of processor elements, a plurality of state control units, and an event distributing means, the multiplicity of processor elements being arranged in matrix form. The processor elements each individually execute data processing in accordance with instruction codes that have been individually set as data, and supply event data as output. The state control units successively switch the instruction codes of the multiplicity of processor elements in accordance with a computer program and the event data, and these state control units consist of a plurality of units that intercommunicate to realize linked operation when necessary. The event distributing means distributes event data to this plurality of state control units that intercommunicate to realize linked operation, whereby the plurality of state control units realize linked operation to control a large-scale state transition.

In the present invention, the term "plurality" signifies any integer that is equal to or greater than "2", and the term "multiplicity" signifies any integer that is equal to or greater than the above-described "plurality". In addition, in the present invention, "event data" are data for causing a transition of a current state that is controlled by the state control units and is composed of data for reporting to other state control units the current state that is being controlled by a particular state control unit.

In other words, in the array-type processor of the present invention, the state control unit is composed of a plurality of units that intercommunicate to realize linked operation as necessary, and an event distributing means distributes event data to this plurality of state control units that intercommunicate and realize linked operation, whereby the plurality of state control units can cooperate to control a large-scale state transition.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Construction of the First Embodiment

Figure 1:
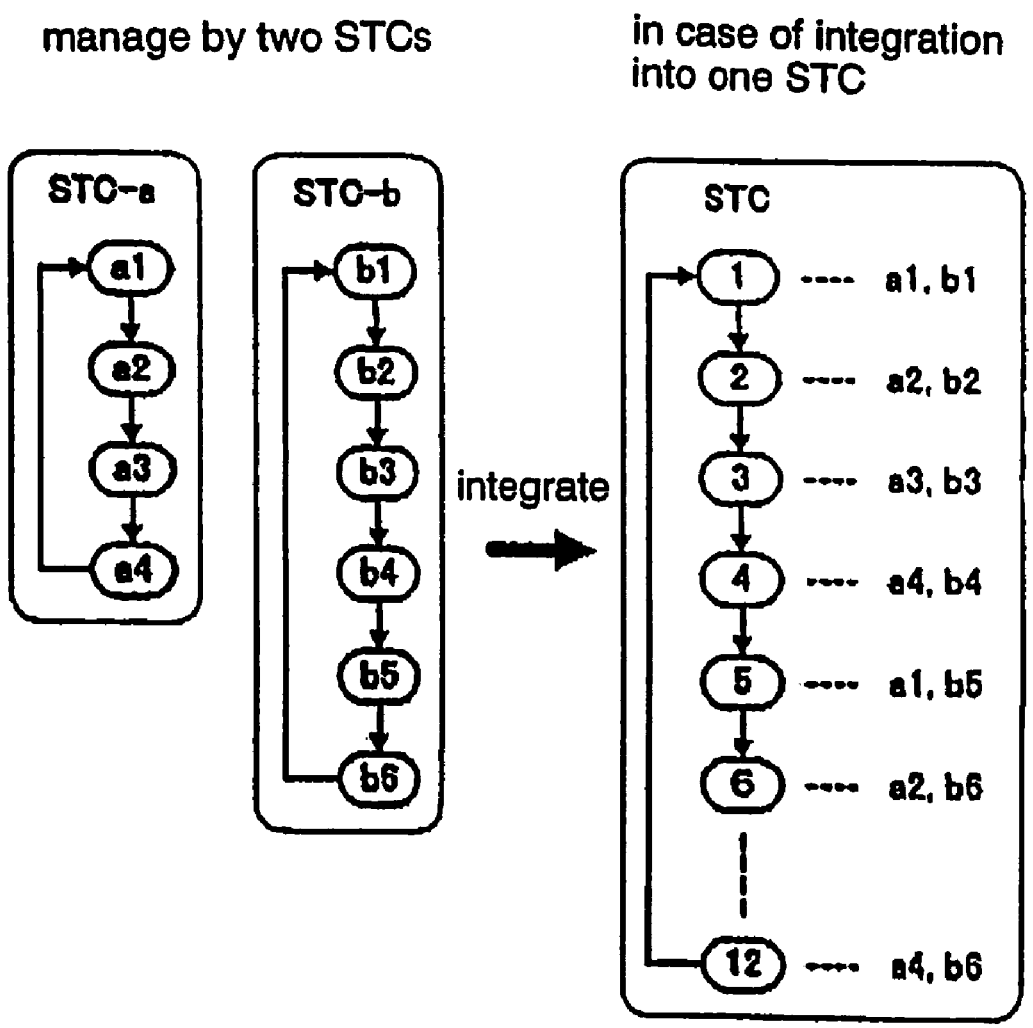
FIG. 1 is a schematic view showing a state in which two state transitions are integrated as one.

The first embodiment of the present invention is first explained with reference to FIGS. 2 to 7. As shown in FIG. 5, array-type processor 100 of the present embodiment includes as its principal construction: state control units 101, processor elements 102, memory controller 103, and read multiplexer 104.

Figure 2:
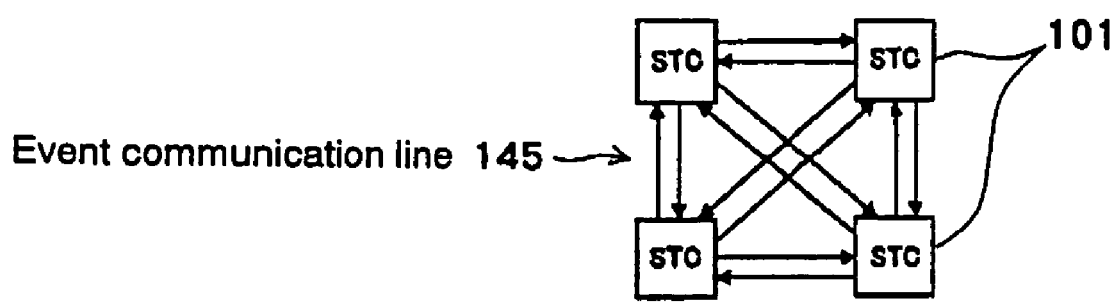
FIG. 2 is a schematic view showing the communication paths of event data in the array-type processor of the first embodiment of the present invention.
Figure 3:
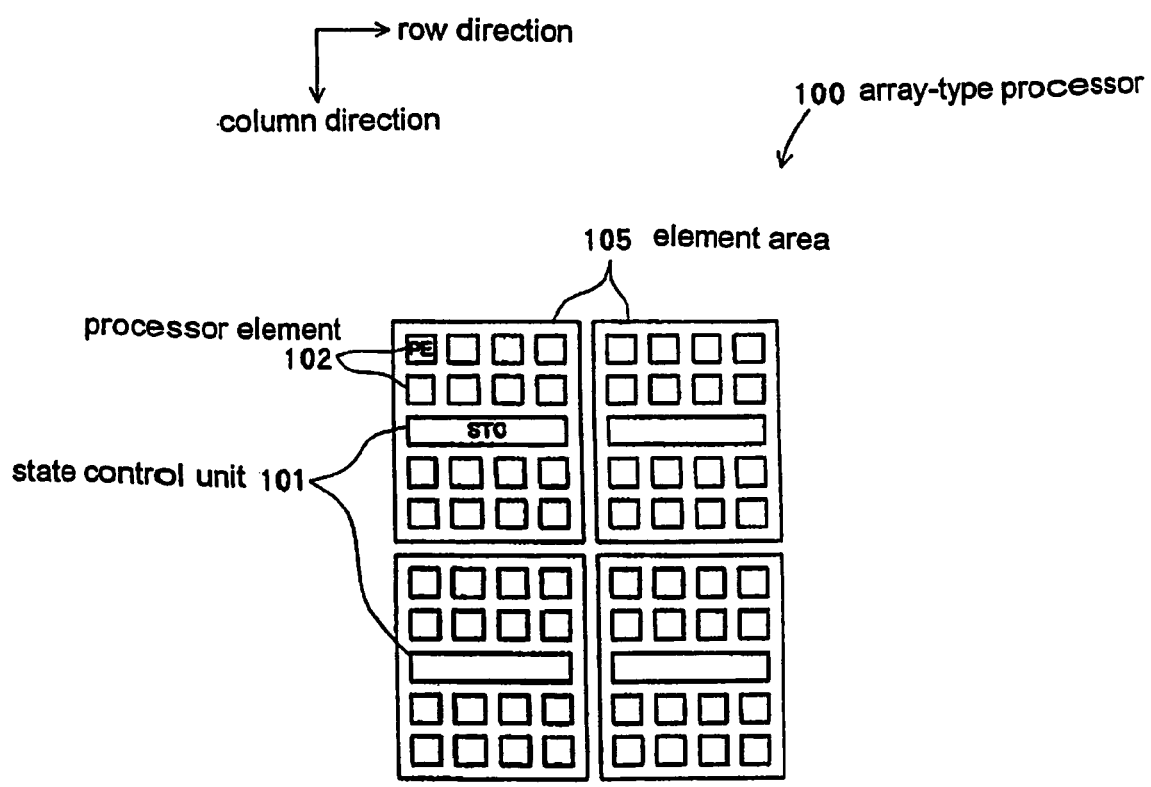
FIG. 3 is a schematic block diagram showing the physical configuration of an array-type processor.

In addition, as shown in FIGS. 2 and 3, in array-type processor 100 of the present embodiment, state control units 101 are constituted by a plurality of units that intercommunicate to realize linked operation, and the multiplicity of processor elements 102 is divided into element areas 105 that correspond in number to state control units 101.

The each of the plurality of state control units 101 is connected to processor elements 102 of a respective area of the plurality of element areas 105, each state control unit 101 being arranged in the respective element area 105 of processor elements 102 to which that state control unit 101 is connected.

To state in greater detail, the multiplicity of processor elements 102 is arranged in rows in columns for each of the plurality of element areas 105, and the plurality of element areas 105 that are divided into rectangles are also arranged in rows and columns. Each of state control units 101 is formed in a shape that is equivalent to one row of processor elements 102 in element areas 105, and each of state control units 101 is arranged in substantially the center in the column direction of a respective element area 105.

In the interest of simplifying the following explanation, four element areas 105-1-105-4 in array-type processor 100 of the present embodiment are arranged in two rows and two columns, and 16 processor elements 102 are arranged in four rows and four columns in each of element areas 105, as shown in the figures.

Further, the horizontal direction in FIG. 2 is the row direction and the vertical direction is the column direction, the rows are arranged in the direction of columns and the columns are each arranged in the row direction. As a result, state control units 101 are each formed in a shape that is equivalent to a row of four processor elements 102 of element areas 105 and are arranged between the second and third rows of processor elements 102 of element areas 105.

As shown in FIG. 5, memory controller 103 transmits various types of data that are received as input from the outside to state control units 101 and processor elements 102 of element areas 105, and read multiplexer 104 supplies various types of data that are read from processor elements 102 to the outside as output.

Processor elements 102 execute data processing on the various types of data that have been received as input from memory controller 103 and supply the various types of data that have undergone data processing as output to read multiplexer 104. State control units 101 control the state transitions of processor elements 102 of element areas 105 and thereby cause processor elements 102 of these element areas 105 to execute various types of data processing.

Figure 4A:
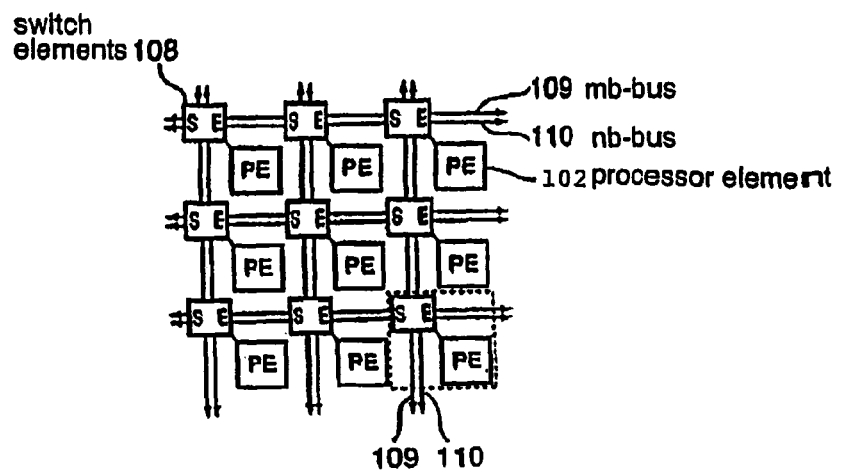
FIG. 4 is a block diagram showing the physical configuration of, for example, the m/nb-buses of an array-type processor.

To state in greater detail, as shown in FIGS. 3 and 4, the multiplicity of processor elements 102 are arranged in rows and columns together with a multiplicity of switch elements 108 in each of element areas 105, and the multiplicity of processor elements 102 are connected in a matrix by a multiplicity of mb (m-bit) buses 109 and a multiplicity of nb (n-bit) buses 110 by way of these switch elements 108.

Figure 4B:
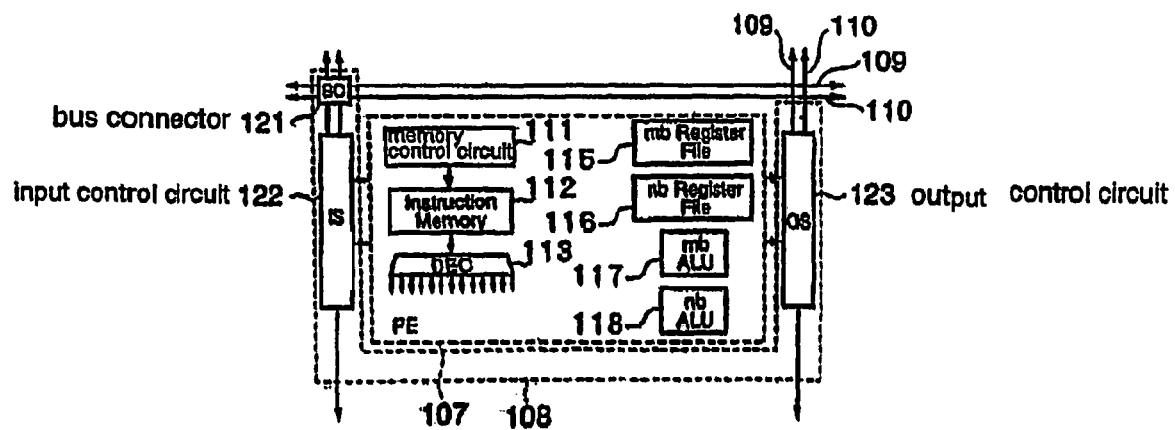
Figure 5:
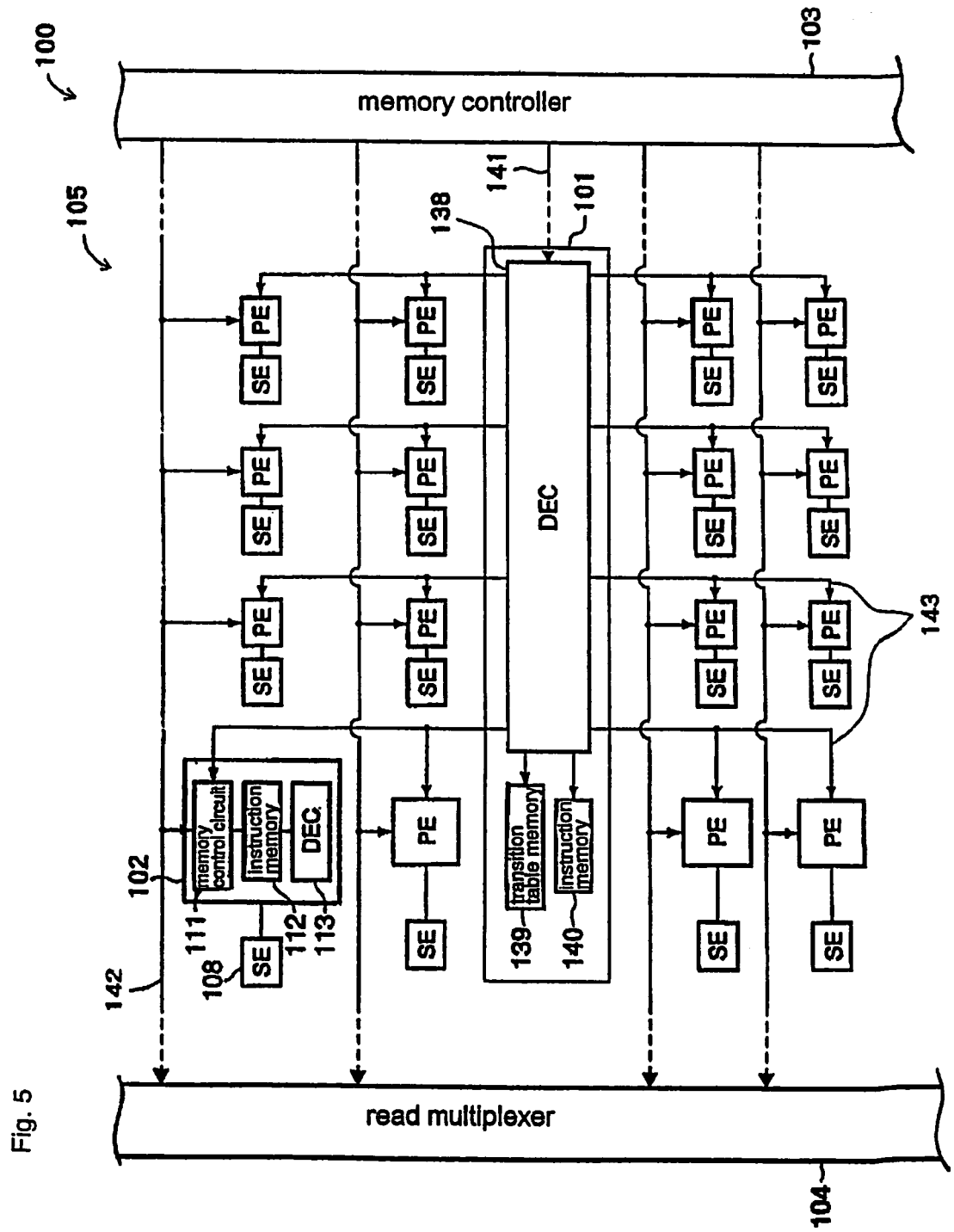
FIG. 5 is a block diagram showing the physical configuration of, for example, the instruction buses.

Further, as shown in FIG. 4B, processor elements 102 each include: memory control circuit 111, instruction memory 112, instruction decoder 113, mb-register file 115, nb-register file 116, mb-ALU (Arithmetic and Logical Unit) 117, nb-ALU 118, and internal variable wiring (not shown in the figure); and switch elements 108 each include bus connector 121, input control circuit 122, and output control circuit 123.

As shown in FIG. 5, each of the plurality of state control units 101 includes instruction decoder 138, transition table memory 139, and instruction memory 140; instruction decoder 138 and memory controller 103 being connected by instruction bus 141.

Eight rows of instruction buses 142 are parallel-connected from memory controller 103 to read multiplexer 104, each row of these eight rows of instruction buses 142 being connected to memory control circuits 111 of the eight columns of processor elements.

One instruction decoder 138 of state control units 101 connects to two sets of four columns of address buses 143, each column of these address buses 143 being connected to memory control circuits 111 in two rows of processor elements 102.

Instruction bus 141 is formed with a bus width of, for example, 20 bits, instruction buses 142 and address buses 143 are formed with a bus width of, for example, 8 bits, and memory controller 103 is connected to the four state control units 101 by instruction buses 141.

In array-type processor 100 of this embodiment, however, each of state control units 101 is connected to processor elements 102 of a respective area of element areas 105, as previously explained, and each of these state control units 101 executes state control over only processor elements 102 to which it is connected.

In array-type processor 100 of the present embodiment, moreover, the instruction codes of the multiplicity of processor elements 102 and the multiplicity of switch elements 108 of element areas 105 are set by data as contexts that successively switch in a computer program that is supplied from the outside; and the instruction codes of state control units 101 that switch these contexts with each operation cycle are set by data as operation states that successively undergo transitions.

Thus, as shown in FIG. 5, each state control unit 101 stores the above-described instruction codes for its own operation as data in instruction memory 140 and stores transition rules for causing successive transitions of the plurality of operation states as data in transition table memory 139.

Each of state control units 101 causes successive transitions of the operation states in accordance with the transition rules of transition table memory 139, and generates instruction pointers of processor elements 102 and switch elements 108 from the instruction codes of instruction memory 140.

As shown in FIG. 4B, switch elements 108 share the instruction memories 112 of adjacent processor elements 102, and state control units 101 supply the instruction pointers of processor elements 102 and switch elements 108 that have been generated to instruction memories 112 of processor elements 102.

Since the plurality of instruction codes of processor element 102 and switch element 108 is stored as data in these instruction memories 112, one instruction pointer that is supplied from state control unit 101 designates the instruction codes of both processor element 102 and switch element 108. Instruction decoder 113 decodes the instruction codes that have been designated by instruction pointers and controls the operation of switch elements 108, internal variable wiring, and m/nb-ALUs 117 and 118.

Mb-buses 109 transmit mb, i.e., 8 bits, of processing data and nb-buses 110 transmit nb, i.e., 1 bit, of processing data, and switch elements 108, operating under the control of instruction decoder 113, thus control the connection relations of the multiplicity of processor elements 102 realized by m/nb buses 109 and 110.

To state in greater detail, bus connectors 121 of switch elements 108 are linked in four directions with mb-buses 109 and nb-buses 110 and control the interconnection of the plurality of mb-buses 109 and the interconnection of the plurality of linked nb-buses 110 that are linked in this way.

Thus, in array-type processor 100, state control units 101 for each of the plurality of element areas 105 successively switch the contexts of processor elements 102 with each operation cycle in accordance with a computer program that is supplied from the outside, whereby the multiplicity of processor elements 102 simultaneously perform data processing that can be freely and individually set for each stage.

As shown in FIG. 4B, input control circuit 122 controls the connection relations for data input from mb-buses 109 to mb-register file 115 and mb-ALU 117 and the connection relations for data input from nb-buses 110 to nb-register file 116 and nb-ALU 118.

Output control circuit 123 controls the connection relations of data output from mb-register file 115 and mb-ALU 117 to mb-buses 109 and the connection relations of data output from nb-register file 116 and nb-ALU 118 to nb-buses 110.

The internal variable wiring of processor elements 102 controls the connection relations of mb-register file 115 and mb-ALU 117 inside processor elements 102 and the connection relations of nb-register file 116 and nb-ALU 118 in accordance with the operation control of instruction decoder 113.

In accordance with the connection relations that are controlled by the internal variable wiring, mb-register file 115 temporarily holds the m bits of processing data that have been received as input from, for example, mb-buses 109, and supplies these data as output to, for example, mb-ALU 117.

In accordance with the connection relations that are controlled by the internal variable wiring, nb-register file 116 temporarily holds n bits of processing data that have been received as output from, for example, nb-buses 110, and supplies these data as output to, for example, nb-ALU 118.

In accordance with the operation control of instruction decoder 113, mb-ALU 117 executes data processing using the m bits of processing data, and nb-ALU 118 executes data processing in accordance with the operation control of instruction decoder 113 using the n bits of processing data, whereby the appropriate data processing of m bits and n bits is executed in accordance with the bit number of the processing data.

The results of this processing in processor elements 102 for each element area 105 are fed back as event data to state control units 101 as necessary, and these state control units 101 therefore use the event data that have been received as input to both cause the transitions of operation states to the next operation states and switch the contexts of processor elements 102 to the contexts of the next step.

In array-type processor 100 of the present embodiment, however, the eight rows and eight columns of processor elements 102 are divided into two rows and two columns of element areas 105 as previously described, and the four state control units 101 are each arranged in a respective element area of these two rows and two columns of element areas 105.

Prescribed processor elements 102 in each of these element areas 105 are then connected to state control units 101 by dedicated event communication lines 145, which is the event distributing means, and the plurality of state control units 101 is further interconnected by event communication lines 145.

Figure 7:
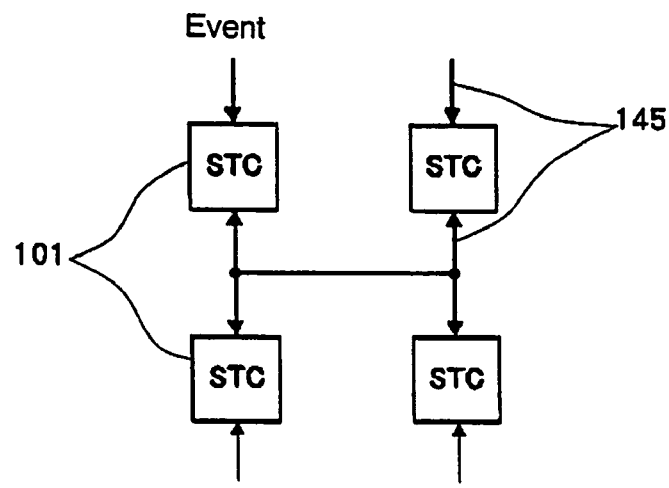
FIG. 7 is a schematic view showing the communication paths of event data of an array-type processor.

As shown in FIG. 7, these event communication lines 145 both transmit event data from processor elements 102 to state control units 101 for each of element areas 105 and, as shown in FIG. 1, distribute event data from each of four state control units 101 to the three other state control units 101.

Figure 6:
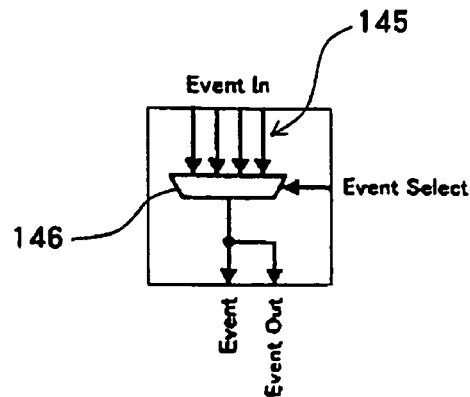
FIG. 6 is a circuit diagram showing the input selection circuit, which is the input selection means.

For this reason, input selection circuit 146, which is the input selection means, is provided for each of state control units 101 as shown in FIG. 6, and this input selection circuit 146 selects one of the four items of event data that are received in parallel by event communication lines 145 from processor elements 102 and the other three state control units 101.

The selected event data are supplied as output to the other state control units 101, whereby event data are distributed by means of event communication lines 145 from each of the four state control units 101 to the other three state control units 101. The operation of input selection circuit 146 is controlled by state control unit 101 to which it is connected, whereby each of state control units 101 itself selects the event data that are received as input at that state control unit 101.

In array-type processor 100 of the present embodiment, two rows and two columns of state control units 101 are interconnected by means of event communication lines 145 as described above, whereby all four state control units 101 are interconnected by event communication lines 145 and each state control unit 101 is connected to surrounding state control units 101 in eight directions.

Operation of the First Embodiment

In array-type processor 100 of the present embodiment in the above-described configuration, when executing data processing in accordance with a computer program that is supplied from the outside using processing data that have been received as input from the outside, state control units 101 both cause successive transitions of operation states for each of the plurality of element areas 105 and successively switch the contexts of processor elements 102 for each operation cycle.

As a result, each of the multiplicity of processor elements 102 operate simultaneously on data processing that can be freely and individually set for each of these operation cycles, and the switching of the connection relations of this multiplicity of processor elements 102 is controlled by the multiplicity of switch elements 108. At this time, the processing results for processor elements 102 are fed back by event communication lines 145 as event data to state control units 101 for each of element areas 105 as shown in FIG. 6, and at the same time, event data are also transmitted by event communication lines 145 from all other state control units 101.

Each of the plurality of state control units 101 selects by means of input selection circuit 146 one of the plurality of event data that are received as parallel input from processor elements 102 and other state control units 101 as described hereinabove, and in accordance with the selected event data, causes the transition of the operation state to the operation state of the next stage and switches the context of processor elements 102 to the context of the next step.

Further, state control units 101 transmit the event data that have been selected as described hereinabove to all other state control units 101 by event communication lines 145, whereby event data that have been selected by a particular state control unit 101 are communicated to all other state control units 101.

Thus, in array-type processor 100 of the present embodiment, state control units 101 for each of the plurality of element areas 105 control the states of the multiplicity of processor elements 102 separately, but this plurality of state control units 101 intercommunicates to allow linked operation.

Accordingly, one state transition of data processing can be executed at all of processor elements 102 of a plurality of element areas 105, four state transitions can be executed separately at the four element areas 105-1-105-4, or two state transitions can be divided between specific pairs of the four element areas 105-1-105-4.

For example, in array-type processor 100 of the present embodiment, a pair of element areas 105 that are controlled by state control units 101 is arranged in the column direction, whereby, when processing data are transmitted in the row direction, a pair of items of processing data of small volume can be processed simultaneously by two rows of element areas 105 with high efficiency.

The Effects of the First Embodiment

In array-type processor 100 of the present embodiment, event data are distributed to a plurality of state control units 101 by event communication lines 145 as described hereinabove, and it is therefore possible for the plurality of state control units 101 to cooperate to control one large-scale state transition, or for the plurality of state control units 101 to separately control a plurality of small-scale state transitions.

Moreover, in array-type processor 100 of the present embodiment, the transmission of event data by dedicated event communication lines 145 enables high-speed transmission of these data. Further, the interconnection of all of the plurality of state control units 101 by event communication lines 145 allows all of the plurality of state control units 101 to directly communicate event data to each other.

Still further, each of state control units 101 selects one of a plurality of [items of] event data that are simultaneously received as input by event communication lines 145 and can therefore precisely receive event data that are necessary for that state control unit 101. In addition, the single [item of] event data that is selected by input selection circuit 146 is supplied as output to event communication lines 145, and event data that are selected by a particular state control unit 101 can therefore be reported to the other state control units 101.

Modification of the First Embodiment

The present invention is not limited to the above-described embodiment but allows various modifications within the scope of the invention. For example, although a specific example of the number and arrangement of element areas 105 and processor elements 102 was presented in the above-described embodiment, these values are obviously open to various modifications.

Figure 8:
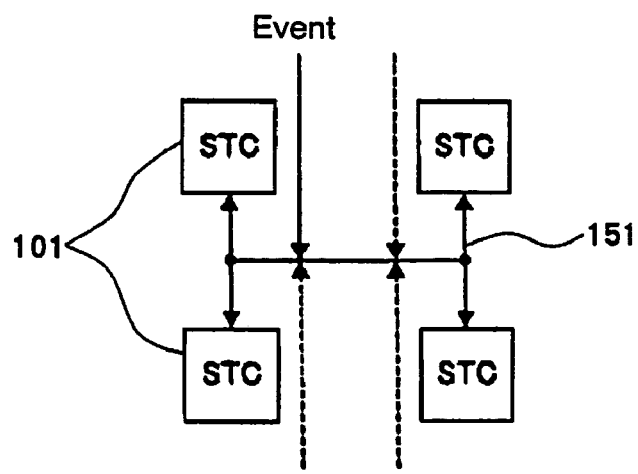
FIG. 8 is a schematic view showing the array-type processor according to a first modification of the first embodiment.

Further, although a case was described in the above-described embodiment in which event data were transmitted from processor elements 102 to state control units 101 by event communication lines 145 for each of element areas 105 and in which each of state control units 101 transmitted event data to the other state control units 101 by means of event communication lines 145 as shown in FIG. 7, the plurality of state control units 101 may also be connected by dedicated event communication lines 151 as shown in FIG. 8, and these event communication lines 151 may receive event data as input from processor elements 102 and state control units 101.

Although a case was described in which event data were transmitted by dedicated event communication lines 145 in the above-described embodiment, event data may also be transmitted by, for example, m/nb-buses 109 and 110 that connect processor elements 102. Transmission of event data by dedicated event communication lines 145 necessitates dedicated hardware but also facilitates simple and high-speed transmission of event data. Transmission of event data by m/nb-buses 109 and 110 subjects m/nb-buses 109 and 110 to heavy use and places a heavy load on these buses, complicating the simple, high-speed transmission of event data; but this construction also eliminates the need for dedicated hardware.

Figure 9:
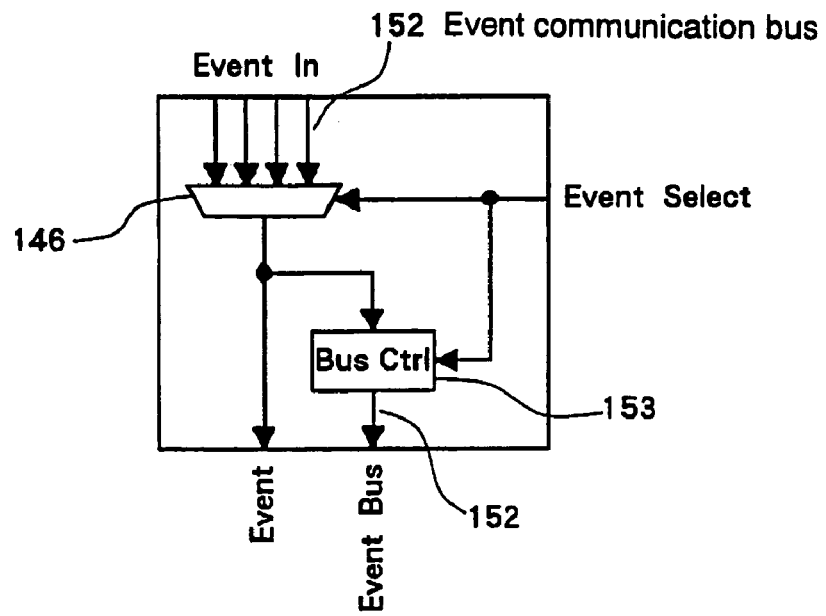
FIG. 9 is a circuit diagram showing the input selection circuit according to a second modification.

Although a case was described in the above-described embodiment in which the plurality of state control units 101 is directly interconnected by dedicated event communication lines 145, it is also possible to connect the plurality of state control units 101 by means of dedicated event communication bus 152 as shown in FIG. 9, wherein these event communication bus 152 serve as the event distributing means.

In this case, bus controller 153 is preferably provided at the points where state control units 101 supply event data as output to event communication bus 152, and the timing at which each of state control units 101 supplies event data to the other state control units 101 is preferably regulated by this bus controller 153.

The use of dedicated event communication lines 145 results in a large amount of hardware when there is a multiplicity of state control units 101, but also allows event data to be transmitted simply and at high speed. The use of a dedicated event communication bus necessitates control such as bus mediation and complicates the simple and high-speed transmission of event data, but allows the free transmission of event data with a limited amount of hardware even when a large number of state control units 101 are used.

Figure 10:
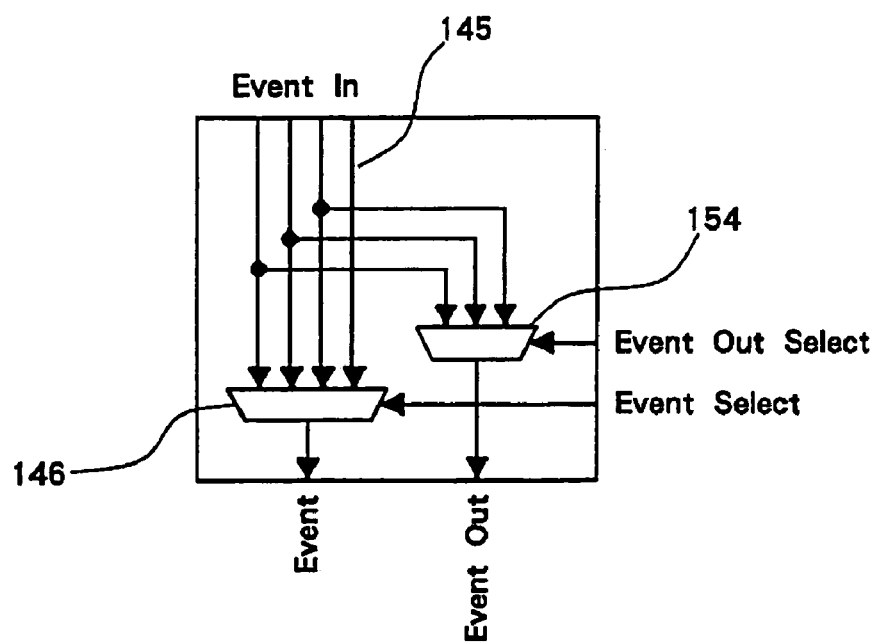
FIG. 10 is a circuit diagram showing the input selection circuit according to a third modification.

Further, a case was described in the above-described embodiment in which one item of data is selected by input selection circuit 146 from the plurality of event data that are simultaneously received by state control units 101, and in which this single item of received event data is transmitted to the other state control units 101. However, as shown in FIG. 10, it is also possible for a single item of data to be selected by output selection circuit 154 separately from the event data that are received by state control units 101 and for this selected single item of event data to be transmitted to other state control units 101.

In this case, since each of state control units 101 can separately select event data that are to be received as input by that state control unit 101 and event data that are to be supplied as output to other state control units 101, this configuration can handle cases in which, for example, event data that should be received at that state control unit 101 differ from event data that should be supplied to other state control units 101.

In the figure, one event communication line 145 on the right side of a plurality of parallel event communication lines 145 is dedicated to input. However, this configuration assumes that a central control unit (to be explained hereinbelow) applies event data as input to this event communication line 145, and when there is no central control unit, all event communication lines 145 are ideally selectable for output. The central control unit distributes event data in common to all state control units 101, and state control units 101 therefore need not supply output to other state control units 101.

In a case in which all state control units 101 are directly connected to each other by way of event communication lines 145 as in array-type processor 100 of the above-described embodiment, transmission does not need to pass by way of a third state control unit 101 when event data are transmitted from a particular state control unit 101 to another state control unit 101.

As a result, state control units 101 need not supply event data that have been received as input from other state control units 101 to other state control units 101, and an item of event data can be selected by output selection circuit 154 from event data that have been received as input from connected processor elements 102 and then supplied as output to other state control units 101.

In addition, in the above-described embodiment, a case has been described in which four state control units 101 that are arranged in two rows and two columns are connected by event communication lines 145 to state control units 101 in eight surrounding directions, whereby all state control units 101 are effectively directly interconnected.

Figure 11:
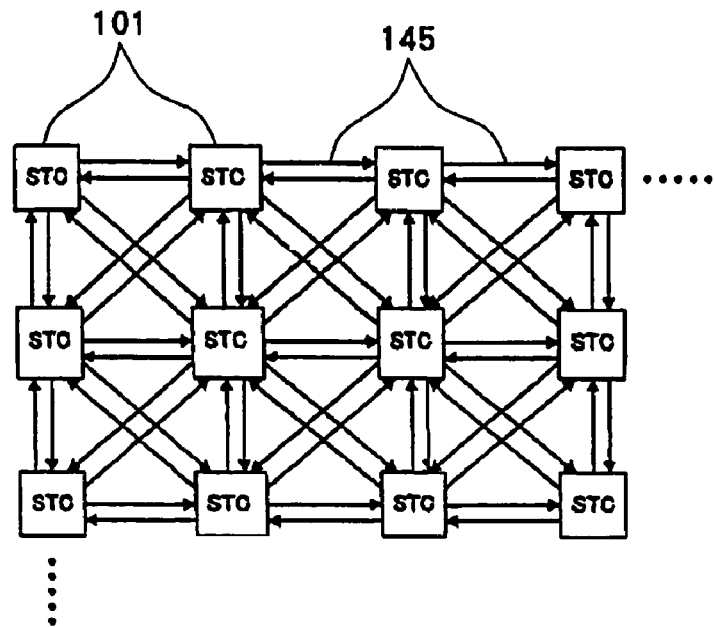
FIG. 11 is a schematic view showing the array-type processor according to a fourth modification.
Figure 12:
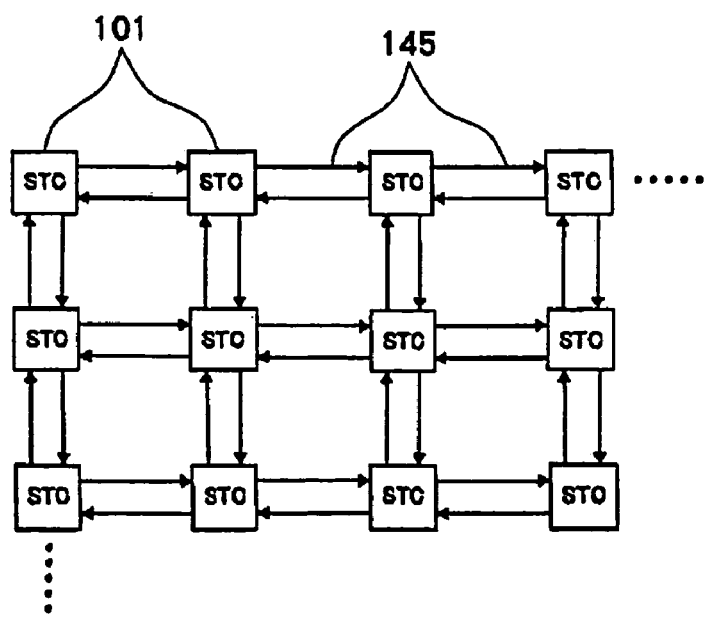
FIG. 12 is a schematic view showing the array-type processor of a fifth modification.

However, as shown in FIG. 11, it is also possible for a multiplicity of state control units 101 to be arranged in more than two rows and two columns and for state control units 101 to be connected only to the eight surrounding state control units 101 by event communication lines 145, or, as shown in FIG. 12, for state control units 101 to be connected only to four state control units 101 in the row and column directions.

When there is a multiplicity of state control units 101, interconnecting all of the multiplicity by event data lines 145 becomes problematic. However, connecting state control units 101 to only a portion of state control units 101 in the vicinity by event communication lines 145 as described hereinabove can, for example, bring about a slight drop in the transmission speed of event data when transmitting event data from a particular state control unit 101 to state control units 101 that are not adjacent in four directions; but this configuration can greatly reduce the amount of hardware.

In array-type processor of the above-described embodiment, a case was described in which processor elements 102 that include each of m/nb-register files 115 and 116 or m/nb-ALU 117 and 118 are connected by m/nb-buses 109 and 110, and data processing and data communication are executed at m bits and n bits.

However, data processing and data communication can also be executed by three or more types of bit numbers using hardware of three or more bit numbers, or data processing and data communication can be executed by a single number of bits using hardware of a single bit number.

In addition, a case was described in array-type processor 100 of the above-described embodiment in which adjacent processor elements 102 and switch elements 108 share instruction memories 112, and in which instruction codes of processor elements 102 and switch elements 108 are therefore generated by a single instruction pointer.

However, instruction memories may be separately provided for processor elements 102 and switch elements 108, and the instruction codes for processor elements 102 and switch elements 108 may each be separately generated by instruction pointers that are specific to each.

Further, in the interest of simplifying the figures and the explanation in the above-described embodiment, a case was described in which one mb-bus 109 and one nb-bus 110 is connected in each of the row and column directions for each processor element 102, but in actuality, a plurality of m/nb-buses 109 and 110 are ideally connected to each of processor element 102.

Figure 13:
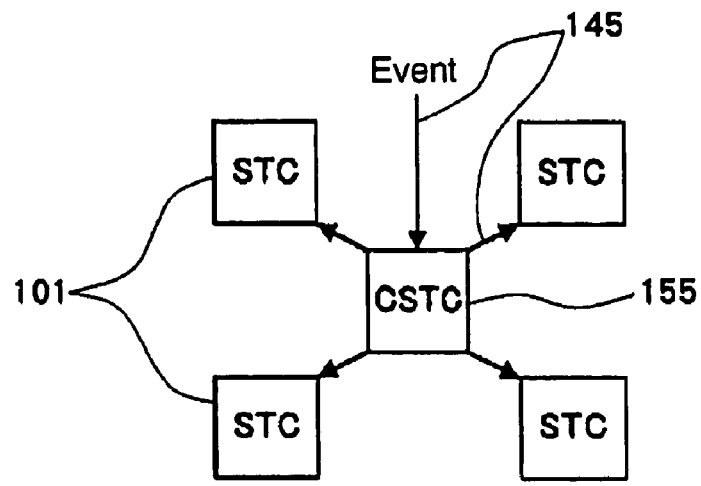
FIG. 13 is a schematic view showing the array-type processor of a sixth modification.

A case was described in array-type processor 100 of the above-described embodiment in which the plurality of state control units 101 are simply intercommunicated on the same level to realize linked operation, but, for example, one of the plurality of state control units 101 can also be set as a higher-order master and the other state control units 101 set as lower-order slaves, or, as shown in FIG. 13, dedicated central control unit 115 may be provided that is of a higher order than the plurality of state control units 101.

In this case, all event data that are supplied as output from each of the plurality of element areas 105 are ideally applied to central control unit 155, and this central control unit 155 ideally distributes the event data to the plurality of state control units 101. However, concentrating all event data in central control unit 155 and then distributing to the plurality of state control units 101 may result in a transmission speed that is slightly lower than a case in which event data are transmitted directly from adjacent state control units 101.

Distributing event data from central control unit 155 to all state control units 101 facilitates the realization of uniform linked operation in all state control units 101 but complicates linked operation when a multiplicity of state control units 101 is divided into a plurality of groups. However, this type of problem can be solved by both directly connecting the plurality of state control units 101 by means of event communication lines 145 as shown in FIG. 14 and then connecting central control unit 155 to the plurality of state control units 101.

Construction of the Second Embodiment

Figure 14:
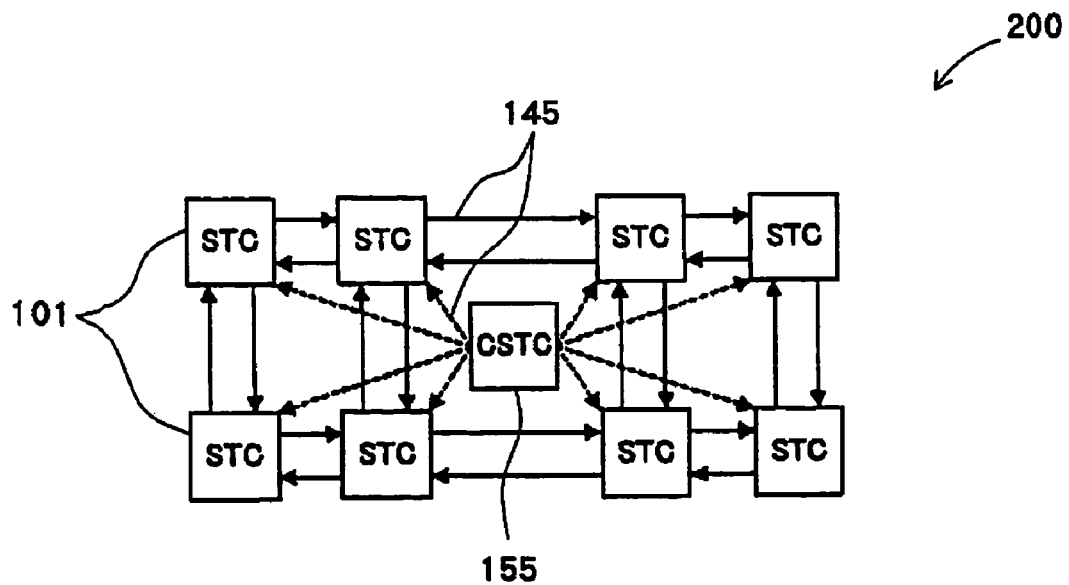
FIG. 14 is a schematic view of the array-type processor of the second embodiment.
Figure 15:
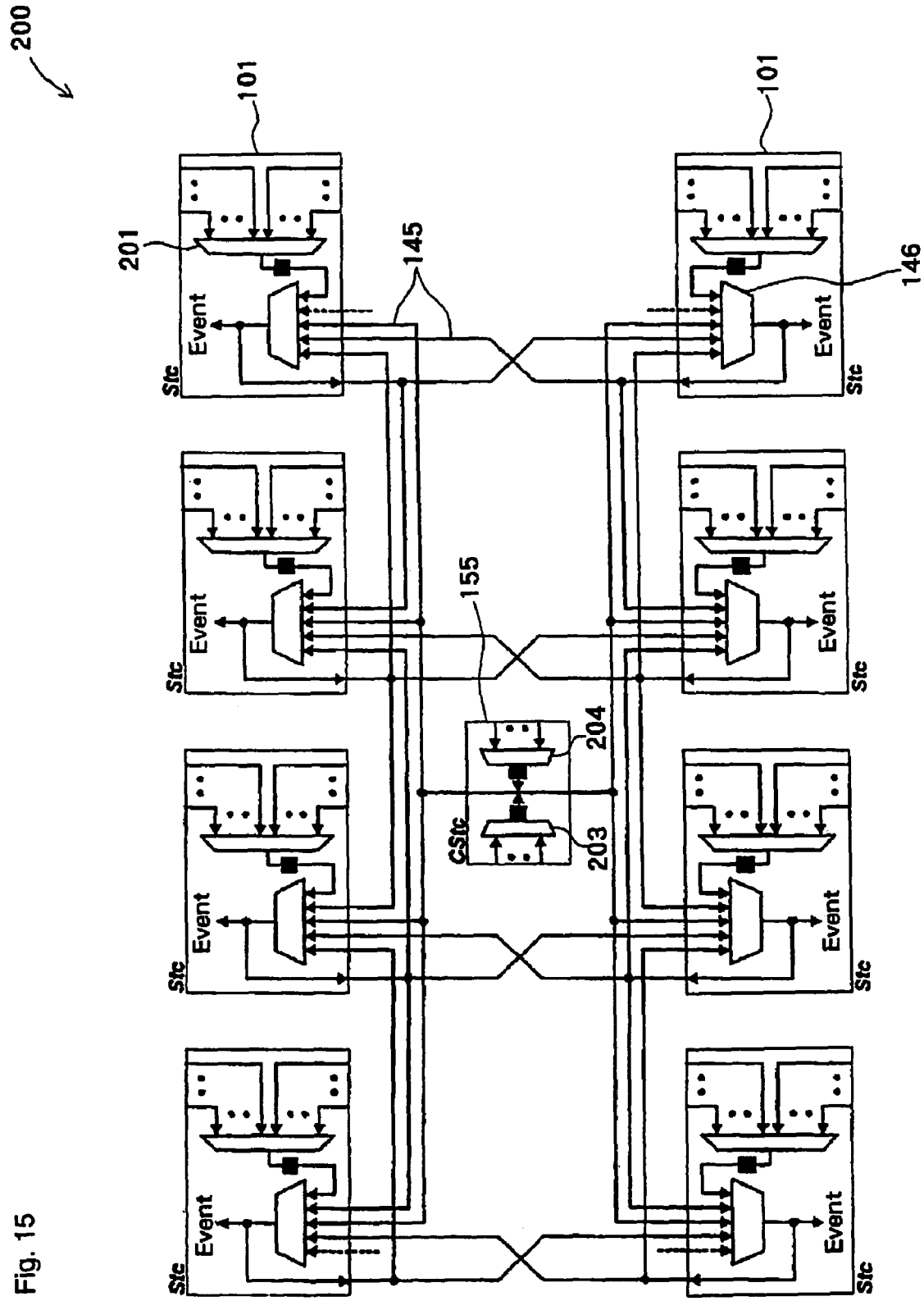
FIG. 15 is a circuit diagram showing the principal elements of an array-type processor.

Explanation next regards this type of array-type processor 200 as the second embodiment of the present invention with reference to FIGS. 14 to 16. In this and subsequent explanations, parts that are identical to parts of a preceding explanation are identified using the same names and reference numerals and redundant detailed explanation is omitted.

In array-type processor 200 of the present embodiment, eight state control units 101 are arranged in two rows and four columns as shown in FIG. 14, these state control units 101 being directly connected by event communication lines 145 to state control units 101 in the four row and column directions. In addition, central control unit 155 is arranged in the center of the eight state control units 101, and this central control unit 155 is connected by event communication lines 145 to all eight state control units 101.

To state in more detail, element selection circuit 201 and input selection circuit 146 are provided for each of state control units 101, as shown in FIG. 15, and element selection circuit 201 selects one of a plurality of items of event data that are supplied as output from processor elements 102 of that element area 105.

Input selection circuit 146 selects one of the items of event data that have been selected by element selection circuit 201 and the plurality of items of event data that have been received as input from the other state control units 101 by event communication lines 145 and supplies this event data as output to that state control unit 101 and the other state control units 101.

Central control unit 155 is provided with first input selection circuit 203 and second input selection circuit 204, whereby, for example, first input selection circuit 203 selects one of a plurality of items of event data that are supplied as output from processor elements 102 of first to fourth element areas 105-1-105-4 and second selection circuit 204 selects one of a plurality of items of event data that are supplied as output from fifth to eighth element areas 105-5-105-8.

Operation of the Second Embodiment

In array-type processor 200 of the present embodiment in the above-described construction, event data that are supplied as output from processor elements 102 in each of the plurality of element areas 105 can be concentrated in central control unit 155 and then uniformly distributed to the plurality of state control units 101, or the plurality of state control units 101 can transmit event data directly to state control units 101 that are adjacent in the row and column directions.

Figure 16A:
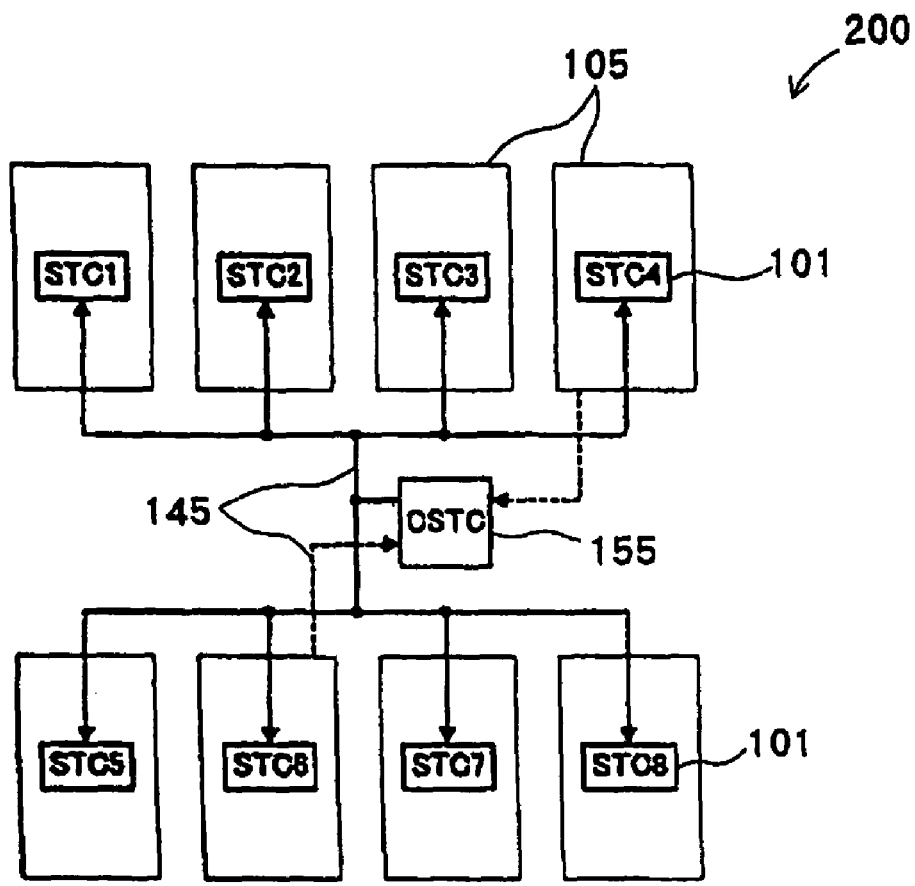
FIG. 16 is a schematic view showing the operation of an array-type processor.
Figure 16B:
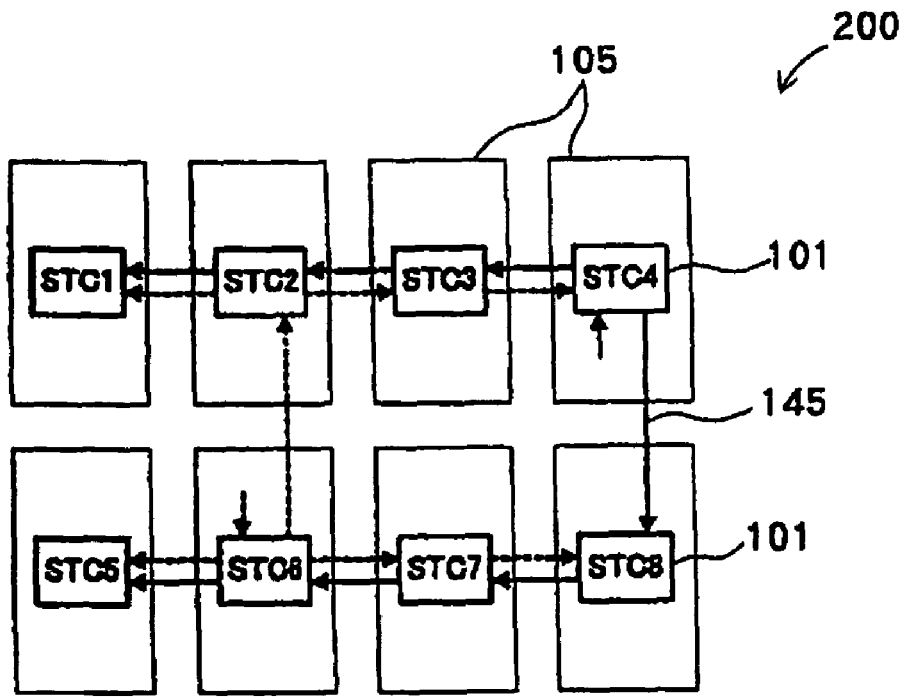

As an example, when event data that are supplied as output by fourth state control unit 101-4 or sixth state control unit 101-6 are to be distributed to all state control units 101, these event data can first be transmitted to central control unit 155 and then distributed to all state control units 101 as shown in FIG. 16A, or the event data can be successively disseminated from state control units 101 to adjacent state control units 101 without passing through central control unit 155, as shown in FIG. 16B.

Modification of the Second Embodiment

The present invention is not limited by the above-described embodiment and is open to various modifications within the scope of the invention. For example, although a case was described in the above-described embodiment in which event data are applied as input to central control unit 155 from processor elements 102 of a plurality of element areas 105, it is also possible for event data to be applied as input to central control unit 155 from processor elements 102 by way of state control units 101 for each of the plurality of element areas 105.

Further, although a case was described in the above embodiment in which central control unit 155 uniformly distributes a single item of event data to all state control units 101, central control unit 155 may, for example, divide and distribute a plurality of items of event data among a plurality of combinations of the multiplicity of state control units 101.

Figure 17:
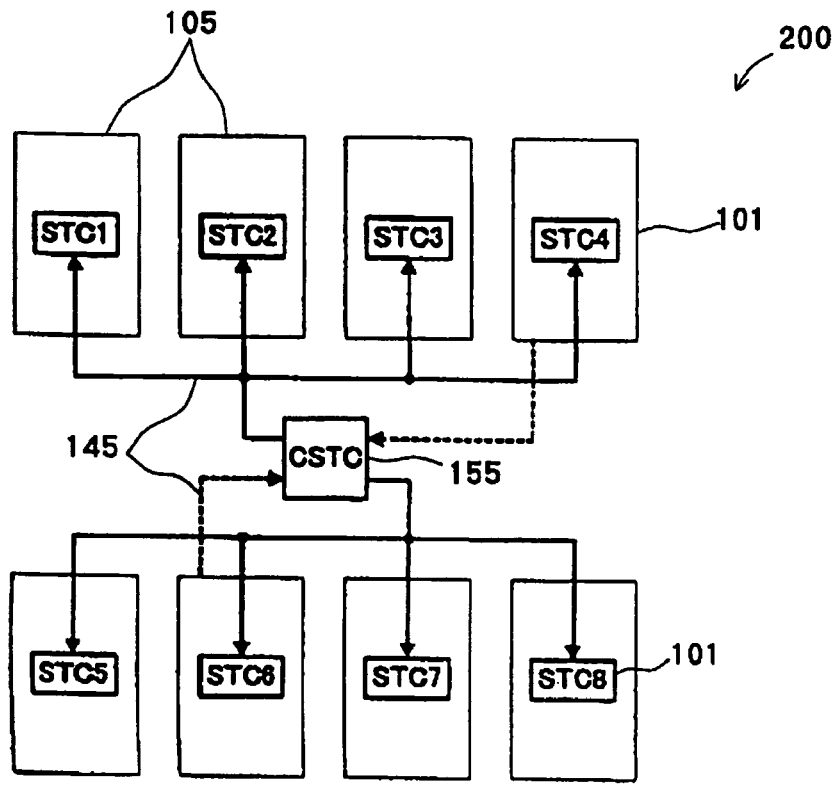
FIG. 17 is a schematic view showing the operation of the array-type processor according to a modification of the second embodiment.

For example, it is possible for central control unit 155 to be configured so as to allow processing of two items of event data at once. Then, if each of event communication lines 145 that connect one central control unit 155 with a multiplicity of state control units 101 is constituted by dual line or a two-bit line, it is possible for central control unit 155 to divide event data that are supplied simultaneously by fourth state control unit 101-4 and sixth state control unit 101-6 and distribute these divided event data to state control units 101-1-101-4 of the first row and state control units 101-5-101-8 of the second row as shown in FIG. 17, whereby different data processing can be executed simultaneously in element areas 105 of the first row and second row.

Figure 18:
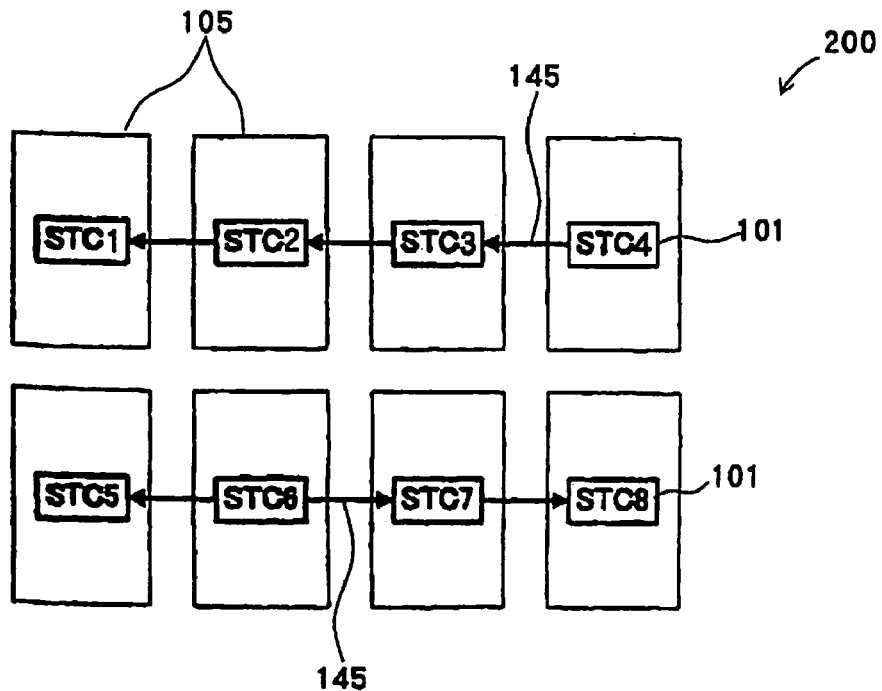
FIG. 18 is a schematic view showing the operation of an array-type processor.
Figure 19:
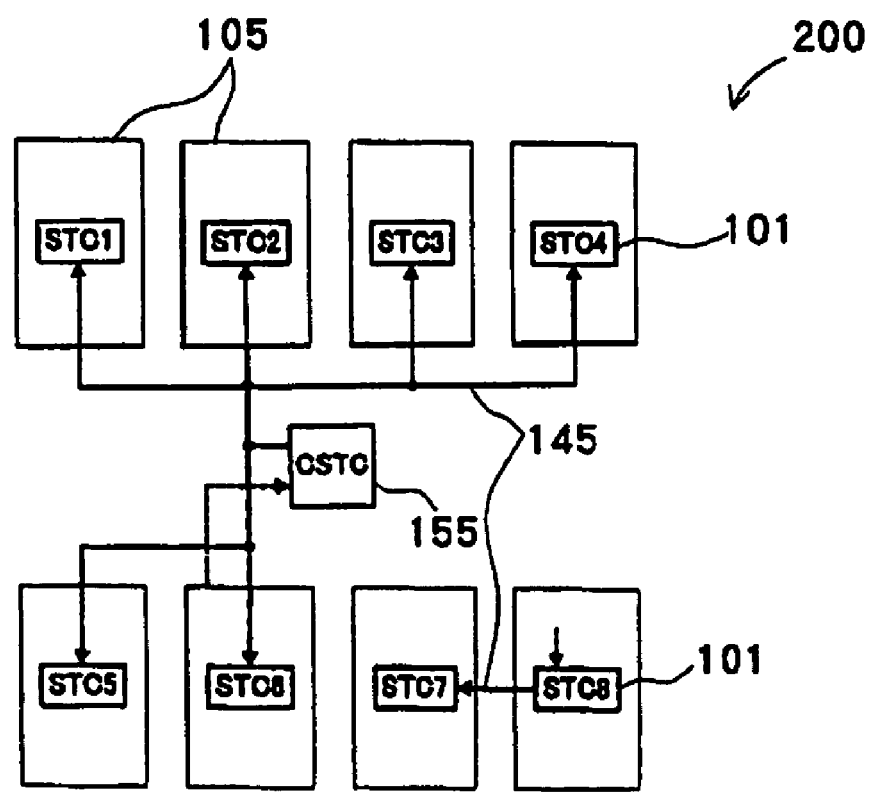
FIG. 19 is a schematic view showing the operation of an array-type processor.

The multiplicity of state control units 101 can also be divided into a plurality of groups and then caused to operate without passing the event data through a central control unit 155 by, as shown in FIG. 18, successively disseminating the event data from state control units 101 to adjacent state control units 101.

Since the successive dissemination of event data to a plurality of state control units 101 is not ideal from the standpoint of speed as previously described, this type of event data is ideally distributed from central control unit 155. To realize this type of distribution, however, central control unit 155 must be able to control a plurality of event data at one time as stated hereinabove; and it is therefore advisable that all conditions be considered in order to select the ideal mode when implementing the array-type processor of the present invention.

Further, as an example, it is also possible for both event data that are supplied as output by sixth state control unit 101-6 to be distributed by central control unit 155 to first to sixth state control units 101-1-101-6 and for event data that are supplied as output by eighth state control unit 101-8 to be transmitted by event communication lines 145 directly to adjacent seventh state control unit 101-7. In this case, it is possible for element areas 105 to be divided into a plurality of groups and for different types of data processing to be executed simultaneously even though central control unit 155 controls no more than one item of event data at a time.

While preferred embodiments of the present invention have been described using specific terms, such description is for illustrative purposes only, and it is to be understood that changes and variations may be made without departing from the spirit or scope of the following claims.

What is claimed is:

1. An array-type processor, comprising:
a multiplicity of processor elements which individually execute data processing and supply event data as output in accordance with instruction codes for which data are individually set, said multiplicity of processor elements being arranged in rows and columns;
a plurality of state control units that intercommunicate to realize linked operation as necessary; and
an event distributing means for distributing said event data to said plurality of state control units, said event distributing means comprising dedicated event communication lines that connect said plurality of state control units,
wherein said instruction codes of said multiplicity of processor elements are successively switched by said plurality of state control units in accordance with a computer program that has been installed in advance and in accordance with said event data, and
wherein said plurality of state control units comprises at least four state control units that are directly interconnected to each other by respective dedicated event communication lines so that each of said at least four state control units is directly connected to all other ones of said state control units.

2. An array-type processor, comprising:
a multiplicity of processor elements which individually execute data processing and supply event data as output in accordance with instruction codes for which data are individually set, said multiplicity of processor elements being arranged in rows and columns;
a plurality of state control units that intercommunicate to realize linked operation as necessary; and
an event distributing means for distributing said event data to said plurality of state control units,
wherein said instruction codes of said multiplicity of processor elements are successively switched by said plurality of state control units in accordance with a computer program that has been installed in advance and in accordance with said event data,
wherein said multiplicity of processor elements is divided into element areas so that there is a state control unit for each element area and there is one state control unit for a plurality of processor elements,
wherein each of said plurality of state control units is connected to said processor elements of a respective element area of said plurality of element areas, and
wherein said event distributing means transmits said event data that are supplied as output by said processor elements of each element area to a respective state control unit of said state control units, said event data are data for causing a transition of a current state that is controlled by the plural state control units and is composed of data for reporting to other state control units the current state that is being controlled by a particular state control unit.

3. An array-type processor in which a multiplicity of processor elements, which individually execute data processing in accordance with instruction codes for which data is individually set, are arranged in rows and columns; and in which a context, which is made up of said instruction codes of said multiplicity of processor elements, is switched for each operation cycle by a state control unit; and in which state transitions of said multiplicity of processors elements are done while changing a configuration of said multiplicity of processor elements, wherein:
transitions of said operating states are done by said state control unit in accordance with a computer program that has been installed in advance and event data which are supplied by said multiplicity of processor elements;
said state control unit is composed of a plurality of units that intercommunicate to realize linked operation as necessary;
the multiplicity of said processor elements is divided among a number of element areas corresponding to the number of said plurality of state control units, said number of element areas being less than said multiplicity of processor elements, said element areas being separate areas of said array-type processor that each have a plurality of processor elements;
each of said plurality of state control units is connected to said processor elements corresponding to each of said plurality of state control units within respective element areas; and
said array-type processor includes an event distributing means for distributing said event data to said plurality of state control units that intercommunicate and realize linked operation.

4. An array-type processor according to claim 3, wherein said event distributing means is constituted by dedicated event communication lines that connect said plurality of state control units.

5. An array-type processor according to claim 3, wherein said event distributing means is constituted by dedicated event communication buses that connect said plurality of state control units.

6. An array-type processor according to claim 3, wherein:
data buses for transmitting processing data of said plurality of processor elements are arranged in matrix form;
a plurality of switch elements, which switch-control a wiring configuration of said data buses in accordance with instruction codes that are individually set as data, are arranged in matrix form together with said processor elements;
said state control units successively switch said instruction codes of said plurality of processor elements and said plurality of switch elements; and
said event distributing means is constituted by said data buses that are switch-controlled by said switch elements.

7. An array-type processor according to claim 4, wherein all of said plurality of state control units are interconnected by said event distributing means.

8. An array-type processor according to claim 4, wherein:
said plurality of state control units are arranged in rows and columns; and
said state control units are connected by said event distributing means to a portion of said state control units that are located in a vicinity.

9. An array-type processor according to claim 8, wherein said state control units are connected by said event distributing means to state control units that are located in eight directions in the vicinity.

10. An array-type processor according to claim 8, wherein said state control units are connected by said event distributing means to said state control units that are adjacent in four row and column directions.

11. An array-type processor according to claim 8, wherein a central control unit is provided for distributing said event data to said plurality of state control units; and said central control unit is connected by said event distributing means to all of said plurality of state control units.

12. An array-type processor according to claim 3, wherein an input selection means is provided for each of said state control units for selecting one from said plurality of items of event data that are simultaneously received as input by said event distributing means.

13. An array-type processor according to claim 8, wherein an input selection means is provided for each of said state control units for selecting one from said plurality of items of event data that are simultaneously received as input by said event distributing means.

14. An array-type processor according to claim 3, wherein one item of said event data that has been selected by said input selection means is supplied as output to said event distributing means.

15. An array-type processor according to claim 3, wherein output selection means is provided for each of said state control units, said output selection means selecting one from a plurality of items of said event data that are simultaneously received as input by said event distributing means and supplying these event data as output to said event distributing means.

16. An array-type processor according to claim 8, wherein:
said multiplicity of processor elements is divided into element areas so that there is a state control unit for each element area;
each of said plurality of state control units is connected to said processor elements of a respective element area of said plurality of element areas; and
said event distributing means transmits said event data that are supplied as output by said processor elements of each element area to a respective state control unit of said state control units.

17. An array-type processor according to claim 3, wherein:
said multiplicity of processor elements is divided into element areas so that there is a state control unit for each element area;
each of said plurality of state control units is connected to said processor elements of a respective element area of said plurality of element areas; and
said event distributing means transmits said event data that are supplied as output by said processor elements of each element area to a respective state control unit of said state control units.

\* \* \* \* \*